T. B. McCONAUGHEY.
Hand-Seeder.
No. 27,644.
Patented Mar. 27. 1860.
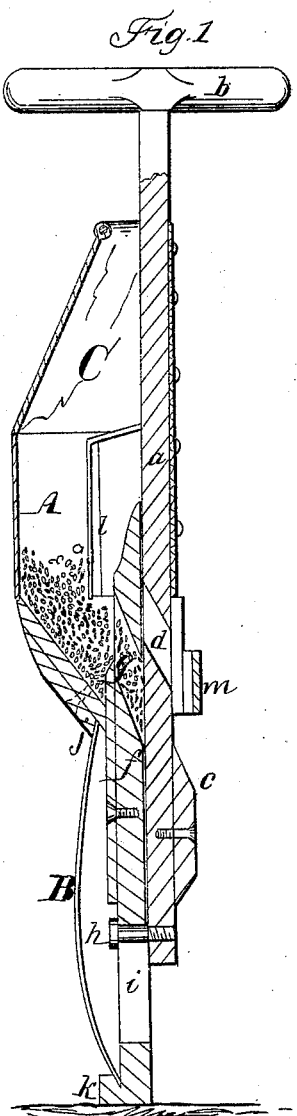
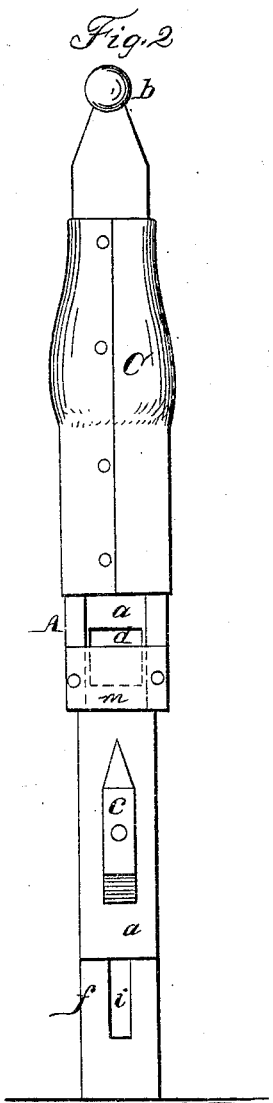

UNITED STATES PATENT OFFICE.

THOS. B. McCONAUGHEY, OF NEWARK, DELAWARE.

IMPROVEMENT IN SEED-PLANTERS.

Specification forming part of Letters Patent No. 27,644, dated March 27, 1860.

*To all whom it may concern:*

Be it known that I, T. B. McCONAUGHEY, of Newark, in the county of New Castle and State of Delaware, have invented a new and Improved Seed-Dropping Device, Designed for Manual Operation; and I do hereby declare that the following is a full, clear, and exact description of the same, reference being had to the annexed drawings, making a part of this specification, in which—

Figure 1 is a vertical central section of my invention; Fig. 2, a front view of the same.

Similar letters of reference indicate corresponding parts in the two figures.

The object of this invention is to obtain a simple device for dropping corn and other seeds in hills, the device being designed for manual operation, and to enable the operator to see the seed discharged, and also to cause the same to be properly distributed in the hills.

The hand seeding-machines that have been previously devised have not been very generally adopted, owing to the uncertainty of the proper operation of the seed-distributing devices and the lack of suitable means to scatter the seed in the hills sufficiently to favor the rapid development of the growing plants and the cultivation of the same.

To enable those skilled in the art to fully understand and construct my invention, I will proceed to describe it.

A represents a seed-box, the front end, $a$, of which extends upward sufficiently to form a handle, and has a cross-piece at its upper end. The end $a$ of the seed-box also extends below its body some distance, and it has a projection, $c$, attached to it, said projection being pointed at its upper end, as shown clearly in Fig. 2. Through the front end, $a$, of the seed-box an opening, $d$, is made, having an oblique position, as shown in Fig. 1, the inner orifice being higher than the outer one. Between the end $a$ and the bottom $e$ of the seed-box a slide, $f$, is placed, said slide extending up into the seed-box, and having an oblique opening, $g$, made in it, corresponding in position to the opening $d$ in the end $a$. The upper end of the slide is retained in proper position by a screw, $h$, which passes through a slot, $i$, in the slide $f$, into the end piece, $a$.

B is a spring, the upper end of which bears against a projection, $j$, on the bottom of the seed-box, and the other end against a projection, $k$, at the lower end of slide $f$. This spring has a tendency to keep the slide pressed down or outward from the seed-box to its fullest extent. Within the seed-box A there is placed a partition, $l$, which forms a chamber to receive the upper end of slide $f$ when the seed-box is depressed.

To the seed-box A a bag, C, is attached. This bag extends upward, and is attached to the end $a$, and is used to increase the capacity of the seed-box.

To the seed-box A, and directly over the opening $d$, there is attached a strip, $m$, a space being allowed between the strip and the opening.

The operation is as follows: The seed-box A is supplied with a requisite quantity of seed, and the operator, whenever a hill of seed is to be dropped, places the lower end of the slide $f$ at the spot and depresses or forces down the seed-box A until the screw $h$ strikes the lower end of slot $i$. When the seed-box reaches its lowest point, the opening $d$ will be in line or register with the opening $g$ of the slide, and the latter opening will be within the chamber formed by the partition $l$, the latter serving as a cut-off. The seed in opening $g$ therefore will pass out through opening $d$, the strip $m$ causing the seed, as it passes from opening $d$, to fall vertically downward and strike the upper pointed end of the projection $c$, which causes the seed to scatter to a certain degree, requisite for a proper disposition of it in the hill. The operator then raises the implement, and the spring B forces down the slide $f$ to its former position, the opening $g$ filling with seed, which is again discharged, as before, at the succeeding depression of the seed-box.

I do not claim, broadly, a seed-slide working within a seed-box, irrespective of the arrangement herein shown and described; but I do claim as new and desire to secure by Letters Patent—

The slide $f$, provided with the opening $g$, and the seed-box A, with the partition $l$, arranged relatively with the slide, and its opening $g$, as shown, in connection with the opening $d$ in the end piece, $a$, of the seed-box, and the projection or scatterer $c$ thereon, and the strip $m$ on the seed-box, all being arranged for joint operation, substantially as set forth.

THOS. B. McCONAUGHEY.

Witnesses:
DAVID McCONAUGHEY,
WILLIAM McCONAUGHEY.